United States Patent
Sonar et al.

(10) Patent No.: US 10,611,355 B2
(45) Date of Patent: Apr. 7, 2020

(54) COUPLING HEAD

(71) Applicant: KNORR-BREMSE Systeme fuer Nutzfahrzeuge GmbH, Munich (DE)

(72) Inventors: Sachin Sonar, Pune (IN); Pankaj Khairnar, Pune (IN); Mahesh Shahapure, Pune (IN)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 16/146,397

(22) Filed: Sep. 28, 2018

(65) Prior Publication Data

US 2019/0031169 A1 Jan. 31, 2019

Related U.S. Application Data

(63) Continuation of application No. PCT/EP2017/057226, filed on Mar. 27, 2017.

(30) Foreign Application Priority Data

Mar. 30, 2016 (DE) .................. 10 2016 003 656

(51) Int. Cl.
*B60D 1/64* (2006.01)
*B60T 17/04* (2006.01)

(52) U.S. Cl.
CPC .............. *B60T 17/043* (2013.01); *B60D 1/64* (2013.01)

(58) Field of Classification Search
CPC ................................. B60T 17/043; B60D 1/64
USPC ..................... 55/309, 385.1; 251/149.5, 213; 280/148.5, 420, 515; 303/9.76, 7, 47, 86, 303/6.01

See application file for complete search history.

(56) References Cited

U.S. PATENT DOCUMENTS 5,683,148 A * 11/1997 Li ....................... B60T 17/043
251/149.5
6,171,482 B1 1/2001 Nichols
8,858,667 B2 10/2014 Sulzyc
(Continued)

FOREIGN PATENT DOCUMENTS

DE 28 33 834 A1 2/1980
DE 199 31 162 A1 1/2001
(Continued)

OTHER PUBLICATIONS

International Search Report (PCT/ISA/210) issued in PCT Application No. PCT/EP2017/057226 dated Dec. 7, 2017 with English translation (seven (7) pages).
(Continued)

*Primary Examiner* — Minh Chau T Pham
(74) *Attorney, Agent, or Firm* — Crowell & Moring LLP

(57) ABSTRACT

A coupling head for a coupling system, in particular for a coupling system for the pneumatic connection of a pneumatic brake system of a towing vehicle and a trailer, has a coupling head housing, a filter insert and a sealing element. The coupling housing has at least one first coupling connection and at least one second coupling connection. The first coupling connection forms a filter insert recess, into which the filter insert is inserted. In the normal operating state, the sealing element lies in a sealing manner against the filter insert and, in the bypass operating state, opens up a bypass between sealing element and filter insert.

11 Claims, 3 Drawing Sheets

(56) References Cited

U.S. PATENT DOCUMENTS

| | | | | |
|---|---|---|---|---|
| 2006/0249927 | A1* | 11/2006 | Metternich | B60D 1/02 |
| | | | | 280/515 |
| 2009/0178964 | A1 | 7/2009 | Cline et al. | |
| 2010/0045030 | A1* | 2/2010 | Roberts | F16L 37/0925 |
| | | | | 285/148.2 |
| 2011/0198164 | A1* | 8/2011 | Potter | B60T 17/043 |
| | | | | 188/151 R |
| 2011/0233895 | A1* | 9/2011 | Risse | B60D 1/62 |
| | | | | 280/420 |
| 2011/0272916 | A1* | 11/2011 | Risse | B60D 1/62 |
| | | | | 280/420 |
| 2012/0032501 | A1* | 2/2012 | Lalone | B60T 15/46 |
| | | | | 303/9.76 |
| 2012/0260615 | A1* | 10/2012 | Sulzyc | B60T 17/043 |
| | | | | 55/309 |
| 2014/0017910 | A1* | 1/2014 | Gerling | B60D 1/64 |
| | | | | 439/35 |

FOREIGN PATENT DOCUMENTS

| | | |
|---|---|---|
| DE | 10 2009 036 619 A1 | 2/2011 |
| DE | 10 2011 002 129 A1 | 10/2012 |
| EP | 2 281 700 A1 | 2/2011 |
| EP | 2 281 700 B1 | 10/2013 |
| GB | 2 446 948 A | 8/2008 |
| JP | 11-77360 A | 3/1999 |
| JP | 2012-233398 A | 11/2012 |
| RU | 2 048 329 C1 | 11/1995 |
| WO | WO 2015/123508 A1 | 8/2015 |

OTHER PUBLICATIONS

German-language Written Opinion (PCT/ISA/237) issued in PCT Application No. PCT/EP2017/057226 dated Oct. 5, 2017 (five (5) pages).

German-language Office Action issued in counterpart German Application No. 10 2016 003 656.7 dated Feb. 20, 2017 (8 pages).

Russian-language Office Action issued in counterpart Russian Application No. 2018138019/11(063065) dated Jul. 9, 2019 with unverified English translation (15 pages).

International Preliminary Report on Patentability (PCT/IB/326 & PCT/IB/373) issued in PCT Application No. PCT/EP2017/057226 dated Oct. 11, 2018, including English translation of document C2 (German-language Written Opinion (PCT/ISA/237) previously filed on Sep. 28, 2018) (six (6) pages).

Japanese Office Action issued in Japanese counterpart application No. 2018-551458 dated Dec. 3, 2019, with partial English translation (Eight (8) pages).

\* cited by examiner

COUPLING HEAD

CROSS REFERENCE TO RELATED APPLICATIONS

This application is a continuation of PCT International Application No. PCT/EP2017/057226, filed Mar. 27, 2017, which claims priority under 35 U.S.C. § 119 from German Patent Application No. 10 2016 003 656.7, filed Mar. 30, 2016, the entire disclosures of which are herein expressly incorporated by reference.

BACKGROUND AND SUMMARY OF THE INVENTION

The present invention relates to a coupling head for a coupling system, in particular for a coupling system for pneumatically connecting a pneumatic brake system of a towing vehicle and a trailer.

A towing vehicle of this type may be, for example, a commercial vehicle such as a truck with a pneumatic brake system.

The prior art has already disclosed coupling systems having coupling heads for pneumatically connecting the brake system of a towing vehicle and a trailer. These systems have a filter unit for filtering the compressed air flowing through the coupling head.

A coupling head of this type is known, for example, from DE 199 31 162 A1 or DE 28 33 834 A1.

DE 10 2009 036 619 A1 discloses, for example, a coupling head for pneumatically connecting the brake system of a towing vehicle and a trailer, in which provision is made of a valve device, which, in the event of a predetermined degree of contamination of the filter unit, controls the latter by means of bypass connections in such a manner that the compressed air flowing through the coupling head no longer flows through the filter of the filter unit, but rather through the bypass connections.

DE 10 2011 002 129 A1 discloses a coupling head having a permanently open bypass which bypasses the filter element. Determined by its design, however, said solution requires a diversion of the compressed air stream, in particular during forward flow bypass operation. A simpler guidance of the flow would be desirable, however.

It is therefore an object of the present invention to develop a coupling head of the type mentioned in the introduction in an advantageous manner, in particular to the effect that an improved flow guidance and emergency function of the coupling head is possible in the case of forward flow and if appropriate also in the case of return flow.

According to the invention, this object is achieved by a coupling head for a coupling system having a coupling head housing, a filter insert and a sealing element, wherein the coupling housing has at least one first coupling connection and at least one second coupling connection, wherein the first coupling connection forms a filter insert recess, into which the filter insert is inserted, and wherein, in the normal operating state, the sealing element bears sealingly against the filter insert, and, in the bypass operating state, opens up a bypass between the sealing element and the filter insert.

The invention is based on the basic concept that, in the bypass operating state, i.e. in a state in which a predetermined degree of contamination of the filter unit is exceeded during forward flow (flow in through the first coupling connection and subsequently through the filter unit), the compressed air supplied flows past the filter insert. Instead, in bypass operation, the intention is for the compressed air to flow along between the sealing element and the outer side of the filter insert. This gives rise to the advantage that the compressed air does not have to flow into the filter insert at all and then diverted from there. Instead, it is sufficient if the air can flow directly past the filter insert through a bypass opening, which may have an annular form, between the sealing element and the filter insert. A diversion of the compressed air stream is therefore no longer necessary. A configuration of this type also makes it possible to reduce the dimensions of the coupling head and in particular the dimensions of the coupling head housing. The sealing element can have a simple design and can be held, for example, in an annular groove in the coupling head housing.

In particular, the coupling head may be a coupling head for a coupling system for pneumatically connecting a pneumatic brake system of a towing vehicle and a trailer.

Furthermore, it can be provided that the sealing element has a radially circumferential sealing lip. This makes it possible to achieve a uniform abutment of the sealing element with its sealing lip against the filter insert. This also leads to secure sealing of the bypass in the normal operating state.

Furthermore, it is possible that, in the mounted state, the sealing lip is positioned against the outer side of the filter insert. In the normal operating state, this achieves secure sealing of the bypass, and therefore the latter is not permanently open.

Moreover, it can be provided that the sealing lip is oriented in the direction of the housing interior of the coupling head housing. This achieves secure and reliable sealing of the bypass both for the normal operating state and for further operating states such as the return flow operation.

Furthermore, it can be provided that the filter insert is fastened separately in the coupling head housing. This allows for fastening independently of the sealing element.

In addition, it is contemplated that the filter insert is fastened by use of a fastener. This makes it possible to achieve simple and reliable fastening of the filter insert in the housing.

By way of example, the fastener may be a screw. The use of screws is cost-effective, because these are standard parts. By way of example, it is contemplated to use self-tapping screws, since these cut their thread itself into the coupling head housing during fitting of the screw.

Furthermore, it can be provided that, in the mounted state, the fastener is arranged on that end of the filter insert which is opposite to the opening of the first coupling connection. This allows for stable fixing and also simple assembly, because it is possible to fit the fastener through the filter insert. The filter insert can be fastened in its filter insert base.

Moreover, it can be provided that, in the mounted state, the fastener is arranged coaxially in relation to the longitudinal axis of the filter insert recess. This allows for the filter insert to be fastened in a centric manner, and this allows for favorable fastening given uniform loading of the filter insert in the coupling head housing.

Furthermore, it is possible that the filter insert has return flow bypass openings, and also a diaphragm, which is arranged in the interior of the filter insert and which closes off the return flow bypass openings sealingly in the normal operating state and, in a return flow bypass state, opens up the return flow bypass openings. This makes it possible to provide an emergency function via a return flow bypass even for return flow operation, i.e. in a case of operation in which air flows outward from the interior of the coupling head through the filter insert in the direction of the first coupling connection. This return flow stream may be the control air flowing into the trailer brake system. Said control air may be returned via the coupling head, and is then discharged, for example, at the trailer control valve of the towing vehicle.

It can be provided that, in the mounted state, the fastener fastens the diaphragm in the filter insert. As a result, both the filter insert and the diaphragm are fastened by way of a single fastener, and this reduces the number of components and facilitates assembly. In principle, other possible fastening methods are also contemplated.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
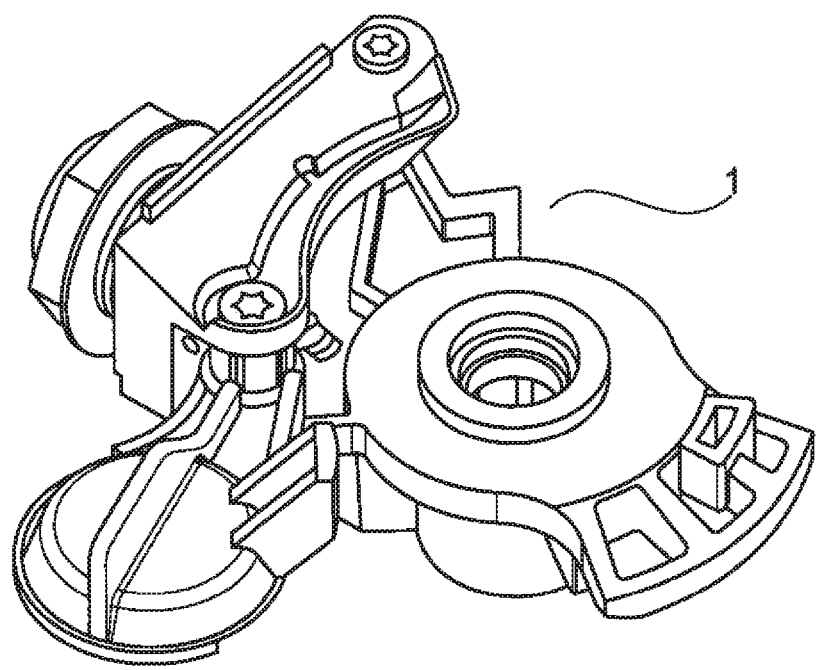
FIG. 1 is a perspective view from above of an exemplary embodiment of a coupling head according to the invention.

FIG. 1 shows a perspective view from above of an exemplary embodiment of a coupling head 1 according to the invention of a coupling system for pneumatically connecting a pneumatic brake system of a towing vehicle, such as a truck, and a trailer.

Figure 2:
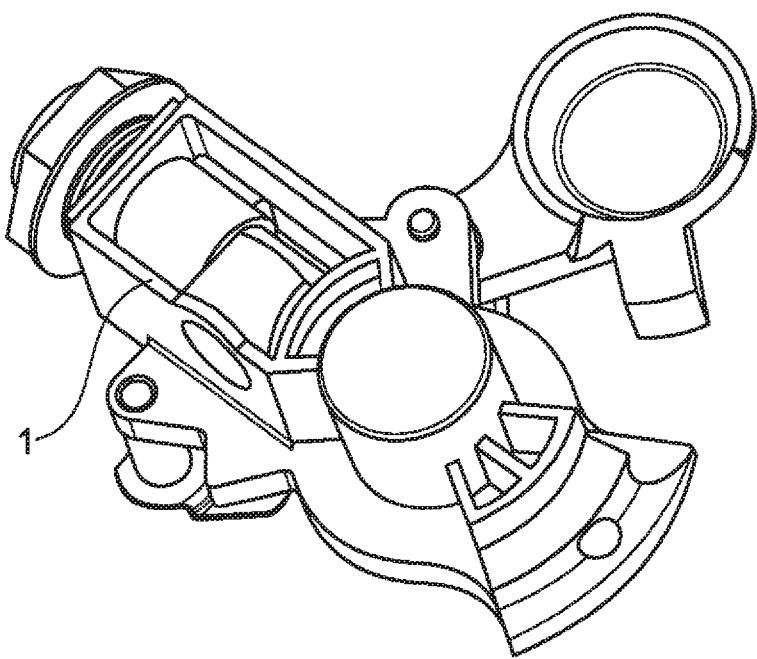
FIG. 2 is a perspective view from below of the coupling head shown in FIG. 1.
Figure 3:
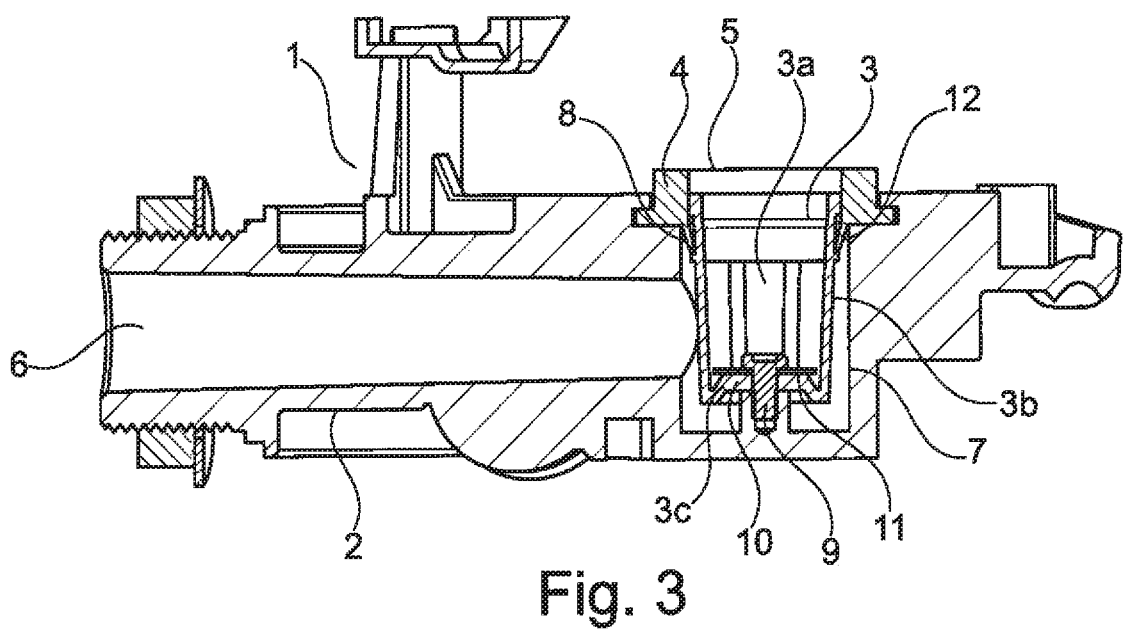
FIG. 3 is a sectional drawing (along the longitudinal axis) of the coupling head shown in FIG. 1.

FIG. 2 shows a perspective view from below of the coupling head 1 shown in FIG. 1, and FIG. 3 shows a sectional drawing (along the longitudinal axis) of the coupling head 1 shown in FIG. 1.

The coupling head 1 has a coupling head housing 2, a filter insert 3 and a sealing element 4.

In the exemplary embodiment shown, the coupling head 1 is mounted on the trailer.

The coupling head housing 2 has a first coupling connection 5 and a second coupling connection 6.

The first coupling connection 5 forms a filter insert recess 7.

The filter insert 3 is inserted into the filter insert recess 7.

The sealing element 4 is held in the coupling head housing 2 in an annular groove.

In the normal operating state, as shown in FIG. 3, the sealing element 4 bears sealingly against the filter insert 3.

The sealing element 4 does not serve for fastening the filter insert 3, however.

Furthermore, the sealing element 4 has a radially circumferential sealing lip 8, which is oriented in the direction of the housing interior of the coupling head housing 2.

As shown in FIG. 3, the sealing lip 8 is positioned against the outer side of the filter insert 3 in the mounted state and normal operating state.

The filter insert 3 is fastened separately in the coupling head housing 2, to be precise by use of a fastener configured here as a screw 9.

This screw 9 is a self-tapping screw.

Furthermore, the filter insert 3 has a filter screen 3a arranged in a radially circumferential manner in its cylindrical or conical outer wall 3b.

In the mounted state, the screw 9 is arranged on that end of the filter insert 3 which is opposite to the opening of the first coupling connection 5, i.e. the filter insert base 3c, and coaxially in relation to the longitudinal axis of the filter insert recess 7.

The filter insert 3 furthermore has return flow bypass openings 10.

The return flow bypass openings 10 are located in the filter insert base 3c of the filter insert 3.

Furthermore, a diaphragm 11 is arranged in the interior of the filter insert 3.

The diaphragm 11 lies on the filter insert base 3c of the filter insert 3 in the interior of the filter insert 3, and covers the return flow bypass openings 10 in the normal operating state.

As can be seen in FIG. 3, in the mounted state, the diaphragm 11 is fastened in the filter insert 3, to be precise likewise by means of the screw 9.

In principle, it is to be noted, however, that the fastening of filter insert 3 and diaphragm 11 by means of the screw 9 is only one possible embodiment, and that other modes of fastening are also contemplated in principle.

The annular gap that can be formed between the filter insert 3 and the sealing element 4 is the forward flow bypass opening 12 of the coupling head 1. Underneath the sealing lip 8 of the sealing element 4, the annular gap of the forward flow bypass opening 12 widens, since here the filter insert 3 does not extend as far as the wall of the filter insert recess 7.

The operation of the coupling head 1 can be described as follows.

In the exemplary embodiment shown, the first coupling connection 5 serves for coupling the trailer to the pneumatic brake system or pneumatic system of the towing vehicle.

The second coupling connection 6 is connected to the pneumatic brake system or pneumatic system of the trailer.

Figure 4:
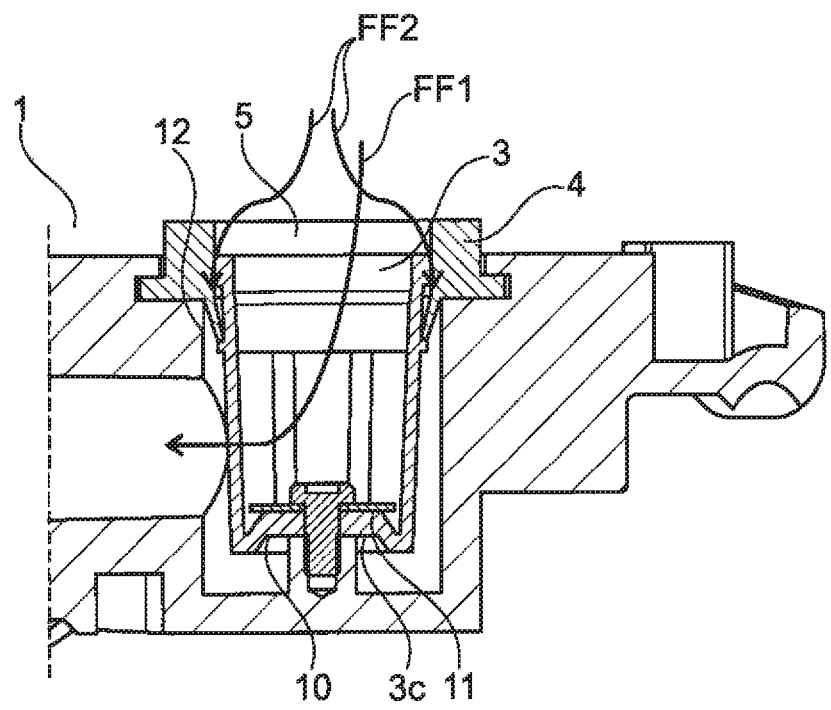
FIG. 4 is a schematic illustration of the forward flow operation of the coupling head shown in FIG. 1.

FIG. 4 shows a schematic illustration of the forward flow operation of the coupling head 1 shown in FIG. 1.

In normal operation, compressed air flows through the first coupling connection 5 through the filter insert 3, this being denoted in FIG. 4 by the arrow with the reference sign FF1 (compressed air stream forward flow normal operation).

The filter insert retains particles located in the compressed air stream, and said particles are prevented from passing further into the pneumatic system of the trailer.

Over the course of the operating time, the filter insert thus becomes increasingly clogged, until, at some point in time, a point at which the filter insert has become clogged or blocked is reached. This is the time at which the coupling head has reached a predetermined degree of contamination of the filter unit, and the filter unit has to be changed or cleaned.

In order to make an emergency function possible (e.g. a continuation of a journey to the workshop), the compressed air can flow through the forward flow bypass opening 12 between the sealing element 4 and the filter insert 3 in said emergency operation, also referred to as bypass operating state.

This is denoted in FIG. 4 by the arrow with the reference sign FF2 (compressed air stream forward flow bypass operating state).

Both in compressed air stream forward flow normal operation and in a compressed air stream forward flow bypass operating state, the diaphragm 11 is pressed sealingly against the filter insert base 3c by the compressed air stream, such that in these states the return flow bypass openings 10 are closed tightly by the diaphragm 11.

Figure 5:
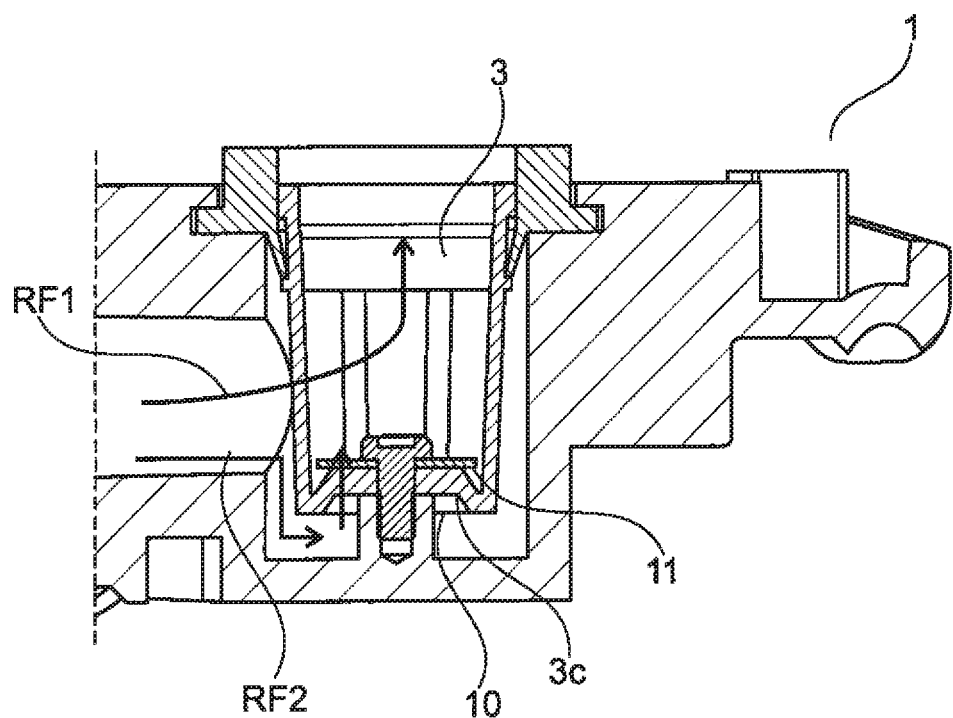
FIG. 5 is a schematic illustration of the return flow operation of the coupling head shown in FIG. 1.

FIG. 5 shows a schematic illustration of the return flow operation of the coupling head 1 shown in FIG. 1.

In the normal return flow operation of the coupling head 1, the compressed air stream is guided through the filter screen of the filter insert 3.

This is denoted in FIG. 5 by the arrow with the reference sign RF1 (compressed air stream return flow normal operation).

In the emergency return flow operation of the coupling head 1, also referred to as return flow bypass state, the compressed air stream is guided through the filter insert base 3c and the return flow bypass openings 10 of the filter insert 3 which are located there.

Since, in this state, the compressed air flows from outside into the interior of the filter insert 3, the diaphragm 11 is pressed inward in such a manner that the return flow bypass openings 10 are opened up.

This is denoted in FIG. 5 by the arrow with the reference sign RF2 (compressed air stream return flow return flow bypass state).

LIST OF REFERENCE SIGNS

1 Coupling head
2 Coupling head housing
3 Filter insert
3a Filter screen
3b Outer wall
3c Filter insert base
4 Sealing element
5 First coupling connection
6 Second coupling connection
7 Filter insert recess
8 Sealing lip
9 Screw
10 Return flow bypass opening
11 Diaphragm
12 Forward flow bypass opening
K Coupling system
FF1 Compressed air stream forward flow normal operation
FF2 Compressed air stream forward flow bypass operating state
RF1 Compressed air stream return flow normal operation
RF2 Compressed air stream return flow return flow bypass state The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A coupling head for a coupling system that pneumatically connects a pneumatic brake system of a towing vehicle and a trailer, comprising:
   a coupling head housing;
   a filter insert; and
   a sealing element, wherein
   the coupling head housing has at least one first coupling connection and at least one second coupling connection,
   the first coupling connection forms a filter insert recess, into which the filter insert is inserted,
   in a normal operating state, the sealing element bears sealingly against the filter insert, and, in a bypass operating state, opens up a bypass between the sealing element and the filter insert; and
   the filter insert has return flow bypass openings, and also a diaphragm, which is arranged in the interior of the filter insert and which closes off the return flow bypass openings sealingly in the normal operating state and, in a return flow bypass state, opens up the return flow bypass openings.

2. The coupling head as claimed in claim 1, wherein the sealing element has a radially circumferential sealing lip.

3. The coupling head as claimed in claim 2, wherein in a mounted state, the sealing lip is positioned against an outer side of the filter insert.

4. The coupling head as claimed in claim 2, wherein the sealing lip is oriented in the direction of a housing interior of the coupling head housing.

5. The coupling head as claimed in claim 1, wherein the filter insert is fastened separately in the coupling head housing.

6. The coupling head as claimed in claim 5, wherein the filter insert is fastened by a screw.

7. The coupling head as claimed in claim 6, wherein in the mounted state, the screw is arranged on that end of the filter insert which is opposite to the opening of the first coupling connection.

8. The coupling head as claimed in claim 7, wherein in the mounted state, the screw is arranged coaxially in relation to the longitudinal axis of the filter insert recess.

9. The coupling head as claimed in claim 1, wherein the filter insert is fastened by a screw to the coupling head housing, and
in the mounted state, the screw fastens the diaphragm in the filter insert.

10. The coupling head as claimed in claim 5, wherein the filter insert is fastened by a fastener.

11. The coupling head as claimed in claim 10, wherein the filter insert has return flow bypass openings, and also a diaphragm, which is arranged in the interior of the filter insert and which closes off the return flow bypass openings sealingly in the normal operating state and, in a return flow bypass state, opens up the return flow bypass openings.

* * * * *